UNITED STATES PATENT OFFICE.

HIRAM L. HALL, OF BEVERLY, MASSACHUSETTS, ASSIGNOR TO THE BEVERLY RUBBER COMPANY.

IMPROVEMENT IN THE MANUFACTURE OF VULCANIZED-RUBBER GOODS.

Specification forming part of Letters Patent No. 22,265, dated December 7, 1858.

*To all whom it may concern:*

Be it known that I, HIRAM L. HALL, of Beverly, in the county of Essex and State of Massachusetts, have invented certain new and useful Improvements in the Manufacture of Vulcanized-Rubber Fabrics or Goods; and I do hereby declare that the following is an exact and true description of my improvements, by which my invention may be distinguished from all others of a similar class, together with such parts as I claim and desire to have secured to me by Letters Patent.

My object has been to add strength to the restored rubber by combining fibrous materials with it, and I have accomplished it in the following manner: When the vulcanized rubber is ground up it is very different from native rubber, and instead of being soft and plastic and in a state to combine readily with fibrous substances or other articles it is dry and hard, and will not stick together or combine with any other substance. This pulverized or ground rubber may be made plastic in many ways; but the mode I prefer, and for which I have already secured Letters Patent, is to boil it in hot water. When boiled it becomes more plastic, and I usually mix with it other substances—such as coal-tar, pine-oil, resin, or shellac—and by grinding it in the usual way produces a plastic mass of rubber mixed with these compounds and strengthened throughout by the fibrous materials, which are thoroughly incorporated with it.

The mode which I use for incorporating the fibrous materials with the vulcanized rubber is fully described in the schedule annexed to the patent granted to me for restoring waste vulcanized rubber, bearing date the 11th day of May, 1858, and which is substantially as follows: I take the vulcanized rubber, with the cloth with which it is found combined, or with additional fibrous materials, and grind it up as fine as possible, and then pass it through "mullers," as they are termed, and bring it into a sheet shape or condition. I then mix it with asphalt, coal-tar, resin, pitch, or shellac, or any similar substance, in the proportion of ten parts of the ground sheet material to two parts of asphalt, resin, pitch, or shellac, and where coal-tar is used four parts of coal-tar should be combined with the ten parts of sheet material. The proportions may be varied to suit the article to be manufactured; but I have secured very good results by using the proportions named. The mixing of the ground sheet material with the resinous or pitchy ingredients is effected by passing them together between the mullers a number of times for a space of time from fifteen to twenty minutes.

By this process I am enabled to incorporate the fibrous materials with the rubber which was formerly dry and had no adhesion or plastic qualities. The result is—and this is the essence of my invention—that I obtain a new product of great strength and practical utility, which is composed of the restored rubber and the gums or coal-tar or pine-oil with which it is mixed and fibrous materials.

I do not limit myself to any particular method of making the restored rubber plastic.

I do not claim combining fibrous materials with native rubber before it is vulcanized for the purpose of then being vulcanized, or for any other purpose, as that has been done before, and is a very different process from mine; but What I do claim as my invention, and desire to have secured to me by Letters Patent, is—

The improvement in the manufacture of rubber goods of every description, which consists in combining fibrous materials with waste vulcanized rubber rendered soft and plastic in the manner herein described, whether such fibrous materials be such only as are found in old or waste vulcanized goods or fabrics or new fibrous materials added to the rubber compound.

HIRAM L. HALL.

Witnesses:
JOHN A. GREENE,
JAMES H. KENDALL.